(12) United States Patent
Tanaka et al.

(10) Patent No.: US 7,807,742 B2
(45) Date of Patent: Oct. 5, 2010

(54) POLYAMIDE RESIN COMPOSITION

(75) Inventors: Kazumi Tanaka, Niigata (JP); Minoru Kikuchi, Niigata (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 426 days.

(21) Appl. No.: 11/995,944

(22) PCT Filed: Jul. 20, 2006

(86) PCT No.: PCT/JP2006/314384
§ 371 (c)(1), (2), (4) Date: Jan. 17, 2008

(87) PCT Pub. No.: WO2007/010984
PCT Pub. Date: Jan. 25, 2007

(65) Prior Publication Data
US 2010/0120961 A1 May 13, 2010

(30) Foreign Application Priority Data
Jul. 22, 2005 (JP) .............................. 2005-212622

(51) Int. Cl.
C08K 3/32 (2006.01)
C08K 5/521 (2006.01)
C08K 5/524 (2006.01)

(52) U.S. Cl. ..................... 524/404; 524/140; 524/147

(58) Field of Classification Search .......... 524/140, 524/147, 414
See application file for complete search history.

(56) References Cited

U.S. PATENT DOCUMENTS

| 3,872,055 | A  | * | 3/1975  | Furukawa et al. ........... 524/112 |
| 4,460,762 | A  |   | 7/1984  | Gaymans et al. |
| 6,303,741 | B1 |   | 10/2001 | Tanaka |
| 6,884,366 | B2 | * | 4/2005  | Otaki et al. ............ 252/188.28 |
| 7,053,143 | B2 | * | 5/2006  | Mori et al. .................. 524/409 |
| 2005/0222345 | A1 | * | 10/2005 | Nakayama et al. .......... 525/419 |

FOREIGN PATENT DOCUMENTS

| EP | 1 029 883 A1 | 8/2000 |
| EP | 1 344 799 | 9/2003 |
| EP | 1 354 906 | 10/2003 |
| JP | 56-149431 | 11/1981 |
| JP | 63-196625 | 8/1988 |
| JP | 06-220320 | 8/1994 |
| JP | 07-090076 | 4/1995 |
| JP | 07-247422 | 9/1995 |
| JP | 2000-234021 | 8/2000 |
| JP | 2000-234022 | 8/2000 |
| JP | 2001-233958 | 8/2001 |
| JP | 2001-329062 | 11/2001 |
| JP | 3419065 | 4/2003 |
| JP | 3427446 | 5/2003 |
| JP | 3458399 | 8/2003 |
| JP | 2003-252986 | 9/2003 |
| JP | 2004-91595 | 3/2004 |

OTHER PUBLICATIONS

Extended European Search Report, including Supplementary European Search Report and European Search Opinion, dated Nov. 2, 2009, for Application No. EP 06 78 1344.

* cited by examiner

*Primary Examiner*—Peter Szekely
(74) *Attorney, Agent, or Firm*—Antonelli, Terry, Stout & Kraus, LLP.

(57) ABSTRACT

A polyamide resin composition comprising a polyamide (X) having a diamine constituent unit which is mainly composed of a m-xylylenediamine unit and a dicarboxylic acid constituent unit which is mainly composed of an adipic acid unit; and specific amounts of a phosphorus acid antioxidant and alkaline component. The polyamide (X) is characterized by a specific range of terminal-group concentration balance and a specific amino-group reaction rate. This composition can simultaneously achieve inhabitation of yellow discoloration and reduction of number of gels or fish eyes.

7 Claims, No Drawings

POLYAMIDE RESIN COMPOSITION

TECHNICAL FIELD

The present invention relates to a polyamide resin composition which is preferably applicable to production of various articles, such as bottles, sheets, films, and fibers. In particular, the present invention relates to a polyamide resin composition comprising a polyamide having a diamine constituent unit which is mainly composed of a m-xylylenediamine unit and a dicarboxylic acid constituent unit which is mainly composed of an adipic acid unit, and having a specific range of terminal-group concentration balance and a specific amino-group reaction rate; and specific amounts of a phosphorus acid antioxidant and alkaline component. This composition can simultaneously achieve inhabitation of yellow discoloration and reduction of number of gels or fish eyes.

BACKGROUND OF THE RELATED ART

In general, polyamide resins (polyamides) are readily oxidizable, thermally unstable polymers. Polyamides are discolored to yellow when being heated in the presence of oxygen, and further discolored to brown or black when undergoing a severer thermal history. Discolored polyamides do not exert their original functions, and thus have low commodity value, whereby these are merely used in black-pigmented molding materials. Brown or black discoloration of polyamides is called "scorch" and such polyamides are excluded from commercial products and should be discarded. In order to prevent yellow discoloration of polyamides during a preparation process (polymerization process), an antioxidant (thermal stabilizer) is generally added to a reaction system during polycondensation in a molten state or preparation of a material (a nylon salt aqueous solution). The most widely used antioxidants for polyamides are phosphorus acid compounds such as hypophosphite salts and phosphite salts. These phosphorus acid antioxidants are oxidized to phosphite salts or phosphate salts to remove oxygen from the polycondensation reaction system and thereby to prevent oxidative damage of polyamide molecules. Phosphite salts or phosphate salts, which are significantly effective for prevention of yellow discoloration and are inexpensive, are remarkably useful antioxidants for polyamides (see Patent Document 1).

Even when colorless polyamides that are not discolored to yellow are shaped into transparent films from a molten state, heterogeneous granules evidently differing from the surrounding polyamides can be visually observed in the prepared films in many cases. This suggests that polyamide molecules having melt viscosity (flowability) that is clearly different from that of normal polyamide molecules are generated in the films, although the molecular structure of the polyamides is not yet changed to an extent that any functional group absorbing visible light is generated. These heterogeneous granules that are clearly different from normal polyamide molecules are called gels or fish eyes. The primary cause of the occurrence of them is probably peculiar polymerization of polyamide molecules or non-linear molecular growth (formation of three-dimensional polymers).

When such polyamides containing a large number of gels or fish eyes are used in production of transparent or thin articles, such as bottles, sheets, films, and fibers, defective products occur with an extremely high frequency, thereby resulting in low productivity. Even if a filter that removes gels or fish eyes formed in molten polyamides is used before molding, microgels cannot be completely removed from polyamides. Furthermore, the filter must be replaced with new ones frequently due to an increase in pressure difference of the filter. This causes a reduction in continuous production time and thus productivity. Also, in the case that such polyamides are used as colored or crystallized molding materials with a relatively large thickness, the surface appearance thereof is likely to be damaged. Therefore, it is desirable that the number of gels and fish eyes in polyamides is as small as possible in any application.

It is known that when phosphorus acid antioxidants such as hypophosphite salts and phosphite salts absorb oxygen contained in reaction systems of polyamides and are oxidized into phosphite salts and phosphate salts, respectively, these acidified antioxidants act as catalysts for amidation reaction. This leads to not only difficulty in control of polycondensation reaction but also specific polymerization or non-linear molecular growth of the polyamide molecules, thereby forming gels or fish eyes. To prevent the formation of gels or fish eyes, alkaline components such as sodium hydroxide and sodium acetate are added simultaneously into the reaction system. Alkaline components are generally called antigelling agents. Gels or fish eyes are formed by not only the existence of the phosphorus acid antioxidants, but also by other factors, such as the existence of other acidic impurities, existence of foreign objects having a physical action, and generation of radicals caused by thermal history. However, for polyamides obtained from diamine components that are mainly composed of m-xylylenediamine and dicarboxylic acid components that are mainly composed of adipic acid, the presence of the phosphorus acid antioxidant significantly affects the formation of gels or fish eyes. As a result, even neutralized phosphite salts or phosphate salts cannot sufficiently reduce the formation of gels or fish eyes.

Patent Documents 2, 3, and 4 disclose solid-phase polymers of poly(m-xylylene adipamide) in which melt polymers of poly(m-xylylene adipamide) having a specific terminal-group balance and relative viscosity are solid-phase polymerized so as to have a specific range of relative viscosity, or a combination of a specific range of relative viscosity and a specific number average molecular weight, in order to reduce the number of gels or fish eyes. Also, Patent Document 5 discloses control of a mixture of two or more polyamides so as to have a specific terminal-group concentration difference. However, none of these documents describes the amino-group reaction rate.

Patent Document 6 discloses a method of solid-phase polymerization of polyamide 6 in a water vapor atmosphere for the purpose of inhibition of the formation of gelled substances, but this document does not describe essential properties of the melt polymer fed for the solid-phase polymerization or antioxidant.

Patent Document 7 discloses a method of solid-phase polymerization of polytetramethylene adipamide in a water vapor containing atmosphere for the purpose of prevention of yellow discoloration. However, a prepolymer containing an excess amount of 1,4-diaminobutane is used as a starting material in this method, and this prepolymer is quite different from the polyamide resin containing an excess amount of carboxyl groups, which is the essential component of the present invention.

Patent Document 8 discloses an engineering polyamide composition in which an aromatic monocarboxylic acid or an aromatic primary monoamine both having a specific concentration and a hypophosphite salt having a specific concentration are incorporated into a polyamide composed of an aromatic dicarboxylic acid and a C6-C18 aliphatic alkylenediamine, and a method of production of the engineering polyamide composition. The monocarboxylic acid or monoamine and the hypophosphite salt are added for the purpose of an improvement in thermal aging resistance. However, this document does not describe the amino-group reaction rate.

Patent Document 9 discloses a polyamide composition comprising two or more polyamides so as to have a specific relationship between the terminal-group concentration difference of polyamides and the concentration of phosphorus atoms. This document, however, does not describe the amino-group reaction rate but teaches that the reduction of the concentration of phosphorus atoms is preferred.

As described above, with respect to polyamides obtained from diamine components mainly composed of m-xylylenediamine and dicarboxylic acid components mainly composed of adipic acid, resins satisfying both prevention of yellow discoloration and the reduction of gelatinization or fisheye formation and a method of preparing the polyamide are still unknown.

[Patent Document 1] Japanese Examined Patent Application Publication No. 48-23199

[Patent Document 2] Japanese Unexamined Patent Application Publication No. 2000-234021

[Patent Document 3] Japanese Unexamined Patent Application Publication No. 2000-234022

[Patent Document 4] Japanese Unexamined Patent Application Publication No. 2001-233958

[Patent Document 5] Japanese Patent No. 3458399

[Patent Document 6] Japanese Patent No. 3427446

[Patent Document 7] Japanese Unexamined Patent Application Publication No. 56-149431

[Patent Document 8] Japanese Examined Patent Application Publication No. 7-64978

[Patent Document 9] Japanese Patent No. 3419065

DISCLOSURE OF THE INVENTION

The present invention relates to a resin composition comprising a polyamide having a diamine constituent unit which is mainly composed of a m-xylylenediamine unit and a dicarboxylic acid constituent unit which is mainly composed of an adipic acid constituent unit. An object of the present invention is to provide a polyamide resin composition that can preferably be used in production of various articles, such as bottles, sheets, films, and fibers, that does not undergo yellow discoloration, and that forms a reduced number of gels or fish eyes.

The inventors have extensively investigated in order to overcome the above problems and have discovered that a polyamide resin composition comprising a polyamide having a diamine constituent unit which is mainly composed of a m-xylylenediamine unit and a dicarboxylic acid constituent unit which is mainly composed of an adipic acid constituent unit, and having a specific range of terminal-group concentration balance and a specific amino-group reaction rate; and specific amounts of a phosphorus acid antioxidant and an alkaline component can achieve both prevention of yellow discoloration and the reduction of gelatinization or fisheye formation. The present invention has been accomplished thereby.

More specifically, a polyamide resin composition of the present invention comprising a polyamide (x) having a diamine constituent unit comprising at least 70 mol % of m-xylylenediamine units and a dicarboxylic acid constituent unit comprising at least 70 mol % of adipic acid units; a phosphorus acid antioxidant; and an alkaline component; the polyamide resin composition satisfying the following formulae (1) to (4):

$$5 \leq A \quad (1)$$

$$0.5 \leq C/B \leq 1.5 \quad (2)$$

$$8 \leq ([COOH]-[NH_2]) \leq 82 \quad (3)$$

$$D \leq 0.9975 \quad (4)$$

where A represents the concentration (ppm) of phosphorus atoms derived from the phosphorus acid antioxidant relative to the total amount of the polyamide (x), the phosphorus acid antioxidant, and the alkaline component; B represents the number of moles of the phosphorus acid antioxidant contained in the composition; C represents the number of moles of the alkaline component contained in the composition; D represents the reaction rate of the total amino groups in the polyamide (x); [COOH] represents the terminal carboxyl group concentration (μequiv/g) in the polyamide (x); and [NH$_2$] represents the terminal amino group concentration (μequiv/g) in the polyamide (x).

DESCRIPTION OF THE PREFERRED EMBODIMENTS

The present invention will now be described in detail below. The polyamide (x) of the present invention comprises a diamine constituent unit comprising at least 70 mol % (including 100 mol %) of m-xylylenediamine units and a dicarboxylic constituent unit comprising at least 70 mol % (including 100 mol %) of adipic acid units. The polyamide (x) can be prepared by polycondensation of a diamine component comprising at least 70 mol % (including 100 mol %) of m-xylylenediamine and a dicarboxylic acid component comprising at least 70 mol % (including 100 mol %) of adipic acid. The method of preparing the polyamide (x) is not limited. Examples of the methods include:

(1) Polycondensation after preparation of a nylon salt aqueous solution composed of a diamine component and a dicarboxylic acid component;

(2) Polycondensation of a dicarboxylic acid component and a diamine component by adding the diamine component continuously or intermittently dropwise to the melt dicarboxylic acid component;

(3) Adding a diamine component continuously or intermittently dropwise to a melt dicarboxylic acid component to prepare a polyamide by polycondensation of the dicarboxylic acid component and the diamine component, and then drying the melt polyamide under reduced-pressure;

(4) Adding a diamine component continuously or intermittently dropwise to a melt dicarboxylic acid component to prepare a polyamide by polycondensation of the dicarboxylic acid component and the diamine component, and then drying the polyamide in a solid state; and (5) Adding a diamine component continuously or intermittently dropwise to a melt dicarboxylic acid component to prepare a polyamide by polycondensation of the dicarboxylic acid component and the diamine component, and then polycondensating the polyamide in a solid state.

Examples of diamines other than m-xylylenediamine include tetramethylenediamine, pentamethylenediamine, hexamethylenediamine, octamethylenediamine, nonamethylenediamine, 1,2-bis-(aminomethyl)-cyclohexane, 1,3-bis-(aminomethyl)-cyclohexane, 1,4-bis-(aminomethyl)-cyclohexane, p-xylylenediamine, o-xylylenediamine, p-phenylenediamine, and m-phenylenediamine. Examples of dicarboxylic acids other than adipic acid include succinic acid, sebacic acid, dodecanedioic acid, isophthalic acid, terephthalic acid, 2,6-naphthalene dicarboxylic acid. Examples of other polyamide-forming compounds include, but not limited to, lactams such as caprolactam, valerolactam, laurolactam, and undecalactam; and aminocarboxylic acids such as 11-aminoundecanoic acid and 12-aminododecanoic acid.

Examples of phosphorus acid antioxidants used in the present invention include hypophosphorous acid compounds such as hypophosphorous acid and hypophosphite salts; phosphorous acid compounds such as phosphorous acid, phosphite salts, and phosphite esters; phosphorus acid compounds such as phosphoric acid, phosphate salts, and phosphate esters. Examples of hypophosphite salts include potassium hypophosphite, sodium hypophosphite, calcium hypophosphite, magnesium hypophosphite, manganese hypophosphite, nickel hypophosphite, and cobalt hypophosphite. Examples of phosphonate salts include potassium phosphite, sodium phosphite, calcium phosphite, magnesium phosphite, manganese phosphite, nickel phosphite, and cobalt phosphite. Examples of phosphite esters include methyl phosphite, ethyl phosphite, isopropyl phosphite, butyl phosphite, hexyl phosphite, isodecyl phosphite, decyl phosphite, stearyl phosphite, and phenyl phosphite. Examples of phosphate salts include potassium phosphate, sodium phosphate, calcium phosphate, magnesium phosphate, manganese phosphate, nickel phosphate, and cobalt phosphate. Examples of phosphate esters include methyl phosphate, ethyl phosphate, isopropyl phosphate, butyl phosphate, hexyl phosphate, isodecyl phosphate, decyl phosphate, stearyl phosphate, and phenyl phosphate. These phosphorus acid antioxidants may be used alone or in combination. Among these antioxidants, preferred are hypophosphorous acid compounds and phosphorous acid compounds, more preferred are hypophosphite and phosphite salts because of highly resistant to yellow discoloration and inexpensiveness, and most preferred are hypophosphite salts. The amount of the phosphorus acid antioxidant to be added, on the basis of phosphorus atoms derived from the phosphorus acid antioxidant, is preferably at least 5 ppm and more preferably at least 30 ppm relative to the total concentration of the polyamide (x), phosphorus acid antioxidant, and alkaline component. At an amount of less than 5 ppm, yellow discoloration cannot be effectively prevented. The upper limit of the amount of the phosphorus acid antioxidant defined above is normally 400 ppm. The phosphorus acid antioxidant may be compounded, for example, by addition of the phosphorus acid antioxidant to a nylon salt aqueous solution as a raw material for the polyamide (x), a diamine component, or a dicarboxylic acid component; addition of the phosphorus acid antioxidant to a melt dicarboxylic acid component; or addition of the phosphorus acid antioxidant to a reaction system during a melt polymerization process. In addition to these methods, any other method that can uniformly disperse the phosphorus acid antioxidant in the polyamide (x) may be employed without limitation.

Examples of alkaline components used in the present invention include hydroxides and carboxylates of alkali metals, and more specifically, include lithium hydroxide, sodium hydroxide, potassium hydroxide, lithium formate, sodium formate, potassium formate, lithium acetate, sodium acetate, potassium acetate, lithium propionate, sodium propionate, potassium propionate, lithium butyrate, sodium butyrate, and potassium butyrate. These alkaline components may be used alone or in combination. Inexpensive sodium hydroxide or sodium acetate is preferred. Preferably, the alkaline component is added in an amount sufficient to neutralize the oxidized phosphorus acid antioxidant, which is 0.5 to 1.5 times, more preferably 0.8 to 1.4 times the amount of the phosphorus acid antioxidant on the molar basis. Since the alkaline component inhibits amidation reaction, the addition of the alkaline component exceeding 1.5 times the phosphorus acid antioxidant on the molar basis is not preferred. These alkaline components may be compounded, for example, by addition of the alkaline components to a nylon salt aqueous solution as a raw material for the polyamide (x), a diamine, or a dicarboxylic acid; by addition of the alkaline components to a melt dicarboxylic acid; or by addition of the alkaline components to a reaction system during a melt polymerization process. In addition to these methods, any other method that can uniformly disperse the alkaline components in the polyamide (x) may be employed without limitation.

The terminal-group balance of the polyamide (x), more specifically, the balance between the terminal carboxyl group concentration ($[COOH]$) and the terminal amino group concentration ($[NH_2]$) should be $[COOH]>[NH_2]$ and the difference ($[COOH]-[NH_2]$) between them ranges from 8 to 82 µequiv/g and more preferably from 10 to 74 µequiv/g. Since the rate of the amidation reaction of the polyamide (x) is maximized when this difference is zero, it is easily expected that the damage of the polyamide molecules can be minimized due to the shortest polymerization time. However, at a difference of less than 8 µequiv/g, in other words, at a terminal amino group concentration exceeding a concentration defined by the present invention, an increase in viscosity caused by some reaction other than the normal amidation reaction is observed. This reaction is believed to be non-linear molecular growth which is the primary cause for the formation of gels or fish eyes. A difference of 82 µequiv/g or lower can maintain the rate of the amidation reaction at a practical level, decrease the polymerization time, inhibit polyamide molecules from being damaged, and thereby reduce the formation of gels or fish eyes.

A polyamide having the above terminal-group balance may be prepared, for example, by polycondensation after preparation of a nylon salt aqueous solution composed of a diamine component and a dicarboxylic acid component; by polycondensation of a dicarboxylic acid and a diamine by adding the diamine continuously or intermittently dropwise to the melt dicarboxylic acid; or by adding a diamine component continuously or intermittently dropwise to a melt dicarboxylic acid component to prepare a polyamide by polycondensation of the dicarboxylic acid component and the diamine component, and then drying or polycondensating the polyamide in a solid-state. The polymerization condition is not particularly limited but polyamides having the above terminal group balance may be prepared by appropriate selection of the fed ratio of a diamine component to a dicarboxylic acid component, the polymerization catalyst, the polymerization temperature, and the polymerization time based on the generally known knowledge in the art. In general, in order to achieve the terminal-group balance of the target polyamide after the polymerization reaction, the feed ratio of polyamide materials is preferably determined such that an excess amount of diamine components is fed in consideration of the fact that part of the diamine component is distilled out of the reaction system together with water formed during the amidation reaction.

The reaction rate of the total amino groups in the polyamide (x) is 0.9975 or below and preferably from 0.9900 to 0.9975. The reaction rate of the total amino groups refers to the ratio of the amino-groups contributing to the amido bonds relative to the total amino groups derived from the diamines and aminocarboxylic acids incorporated into the polyamide (x). The polymerization reaction is controlled such that the unreacted amino groups remaining in the polyamide (x) exceed a specific concentration level. When the concentrations of carboxyl groups and amino groups both contained in the polyamide (x) are equal, the reaction rate of the total amino groups is represented by the following formula (5):

$$D=1-(1/E) \tag{5}$$

where D represents the reaction rate of the total amino groups in the polyamide (x), and E represents the degree of polymerization.

Throughout the investigation, the inventors found out that the number of gels or fish eyes increases drastically at a reaction rate of the total amino groups in polyamides exceeding 0.9975. More specifically, in order to obtain a polyamide containing reduced numbers of gels or fish eyes while not undergoing yellow discoloration, the inventors found the best range of the total amino groups in the presence of a phosphorous acid antioxidant as above which is not disclosed yet.

The reaction rate of the total amino groups can be maintained within the above-described range by controlling the polymerization reaction that can be achieved by adjusting the feed ratio of polyamide materials such that the reaction rate of the total amino groups in a desired degree of polymerization resides within the prescribed range of the present invention.

The relative viscosity of the polyamide (x) is not particularly limited and preferably ranges from 1.83 to 4.20. A relative viscosity of 1.83 or above is a viscosity level practically required when the polyamide (x) is molded into products, such as bottles, films, sheets, and fibers. A relative viscosity of 4.20 or below can prevent the polymerization reaction time from increasing, inhibit polyamide molecules from being damaged, and suppress reactions other than the normal amidation reaction.

The polyamide of the present invention can include other resins such as nylon 6, nylon 66, nylon 6/66, polyesters, and olefins; inorganic fillers such as glass fibers and carbon fibers; platy inorganic fillers such as glass flakes, talc, kaolin, mica, montmorillonite, and organic clays; impact-resistance modifiers such as elastomers; crystal nucleating agent; lubricants such as fatty acid amides, fatty acid metallic salts, and fatty acid amide compounds; antioxidants such as copper compounds, organic or inorganic halide compounds, hindered phenols, hindered amines, hydrazines, and sulfur compounds; thermal stabilizers; antistain agents; UV absorbers such as benzotriazoles; release agents; plasticizers; colorants; fire retardants; and cobalt compounds providing an oxygen-trapping function, within the scope of the invention.

EXAMPLES

The present invention is explained in more detail with reference to Examples and Comparative Examples. The properties were measured and evaluated as follows.

(1) Relative Viscosity

One gram of polyamide accurately weighed was dissolved into 100 cc of 96% sulfuric acid at a temperature of from 20° C. to 30° C. with stirring. Immediately after the polyamide was completely dissolved, 5 cc of the resulting solution was fed into a Cannon-Fenske viscometer. After the viscometer is allowed to stand in a thermostatic oven at 25° C.±0.03° C. for 10 minutes, the falling time (t) of the solution was measured. Similarly, the falling time ($t_0$) of 96% sulfuric acid solely was measured. The relative viscosity of the polyamide was calculated from the observed times t and $t_0$, according to the following formula (6):

$$\text{Relative viscosity}=t/t_0 \tag{6}$$

(2) Concentration of Terminal Amino Groups

Into 30 cc of mixed solvent of phenol and ethanol in a volume ratio of 4:1 was dissolved 0.3 to 0.5 g of polyamide accurately weighed at a temperature of from 20° C. to 30° C. with stirring. After the polyamide was completely dissolved, the solution was subjected to neutralization titration with an aqueous N/100 hydrochloric acid solution with stirring.

(3) Concentration of Terminal Carboxyl Groups

Into 30 cc of benzyl alcohol was dissolved 0.3 to 0.5 g of polyamide accurately weighed at a temperature of from 160° C. to 180° C. under a nitrogen stream with stirring. After the polyamide was completely dissolved, the solution was cooled to 80° C. or lower under a nitrogen stream, and 10 cc of methanol was added with stirring, followed by neutralization titration with an aqueous N/100 sodium hydroxide solution.

(4) Number of Gels or Fish Eyes

Polyamide was melted at 270° C., and a film having a thickness of 50 μm and a width of 18 cm was prepared with a single-screw extruder (diameter: 25 mm) equipped with a T die. The number of gels or fish eyes having a major axis of 50 μm or more, which were found in the area of 10 cm×10 m from the center of the film, was counted with a transmissive-type optical defect inspection apparatus and was expressed by the number of gels or fish eyes per 1 $m^2$. The detection sensitivity of the apparatus was adjusted so as to count the number of gels or fish eyes with a size of 0.05 $mm^2$ or more using a dirt comparison chart (Published by Printing Bureau, Ministry of Finance). The number of gels or fish eyes is preferably 1000/$m^2$ or less.

(5) Yellowness Index (YI)

A colorimeter SIGMA 80 (manufactured by Nippon Denshoku Industries Co., Ltd.) was used. XYZ tristimulus values in the XYZ colorimetric system by reflection from samples (pellets) were measured according to JIS K7103 and the yellowness index was calculated by the following formula (G):

$$YI=100\times(1.28X-1.06Z)/Y \tag{G}$$

Examples 1 to 9 and Comparative Examples 1 to 5

Melt Polymerization for Production of Poly(m-xylylene adipamide)

Into a batch polymerization reactor equipped with a stirrer, a partial condenser, a total condenser, a nitrogen gas conduit, and a decompression valve were placed 1,000 g of adipic acid (purity: 99.85 mass %). A given amount of sodium hypophosphite and a given amount of sodium acetate were further added and then the mixture was purged with nitrogen. The mixture was heated to 190° C. with stirring while a small amount of nitrogen gas was fed. After the adipic acid was melted, 925 g of m-xylylenediamine (purity: 99.90 mass %) was added dropwise continuously over a period of 2 hours under normal pressure, while the temperature of the mixture was raised continuously to 250° C. Water that was distilled out by dropwise addition of m-xylylenediamine was removed out of the reaction system through the partial condenser and the total condenser. The maximum temperature of the top of the partial condenser was 101° C. After the dropwise addition of m-xylylenediamine, the mixture was stirred for 20 minutes while being heated at a rate of 0.2° C./min under normal pressure to promote immobilization of m-xylylenediamine. The pressure was then reduced to 80 kPa over a period of 5 minutes and was maintained at 80 kPa for 15 minutes, while the temperature of the reaction system was kept within the range of 255° C. to 260° C. Thereafter, the resultant polymer in the form of a strand was taken out through a nozzle disposed at a lower portion of the polymerization reactor, was cooled with water, and was cut into pellets of a polyamide resin composition containing amorphous poly(m-xylylene adipamide). The concentration of phosphorus atoms and the molar ratio of alkaline components to phosphorus acid antioxidants are shown in Tables 1 to 4.

[Solid Phase Polymerization of Poly(m-xylylene adipamide)]

Into a 2 L round-bottom flask was placed 600 g of the polyamide resin composition prepared by melt polymerization. After 3.0 g of distilled water was added, the flask was assembled to an evaporator. The flask was placed in an oil bath and was rotated at 80 rpm. The flask was evacuated to 1.33 kPa or less and then returned to normal pressure by feeding nitrogen. This procedure was repeated three times. Thereafter, the temperature of the oil bath was raised from room temperature to 135° C. at a heating rate of 60° C./hour. After the pellet temperature reached 135° C., the flask was evacuated to 1.33 kPa or less. After the pellet temperature reached 200° C., the flask was left to stand for one hour for promoting polymerization. Thereafter, the heating of the oil bath was stopped, the flask was returned to normal pressure by feeding nitrogen and the flask was cooled. At a pellet temperature of 50° C., the pellets of the resin composition containing the polyamide (X) were taken out from the flask. The pellets were extruded with the single-screw extruder into a film. The experimental results are shown in Tables 1 to 4.

In Comparative Example 1 not containing sodium hypophosphite or sodium acetate, both the number of gels or fish eyes was increased and yellow discoloration was noticeable. Also, in the case where none of the conditions given by the formulae (2) to (4) is satisfied, the number of gels or fish eyes was increased (Comparative Examples 2, 3, and 5), or a practically required viscosity was not achieved (Comparative Example 4), regardless of addition of sodium hypophosphite and sodium acetate. The purpose of the present invention was not achieved in any of Comparative Examples.

TABLE 1

|  | Example 1 | Example 2 | Example 3 | Comparative Example 1 |
|---|---|---|---|---|
| Phosphorus acid antioxidant | Na hypophosphite | Na hypophosphite | Na hypophosphite | — |
| Alkaline component | Na acetate | Na acetate | Na acetate | — |
| Phosphorus concentration (ppm): A | 5 | 30 | 151 | — |
| Alkaline component/phosphorus acid antioxidant: C/B | 0.74 | 0.79 | 0.81 | — |
| [COOH]—[NH$_2$] (μequiv/g) | 38 | 41 | 45 | 45 |
| Reaction rate of total amino groups: D | 0.9972 | 0.9974 | 0.9975 | 0.9974 |
| Relative viscosity | 2.68 | 2.65 | 2.65 | 2.62 |
| Number of gels or fish eyes (/m$^2$) | 300 | 100 | 200 | 2,000 |
| Yellowness index (YI) | 0 | −5 | −11 | 8 |

TABLE 2

|  | Example 4 | Example 5 | Example 6 | Comparative Example 2 |
|---|---|---|---|---|
| Phosphorus acid antioxidant | Na hypophosphite | Na hypophosphite | Na hypophosphite | Na hypophosphite |
| Alkaline component | Na acetate | Na acetate | Na acetate | Na acetate |
| Phosphorus concentration (ppm): A | 151 | 151 | 151 | 151 |
| Alkaline component/phosphorus acid antioxidant: C/B | 0.5 | 1.0 | 1.5 | 0.2 |
| [COOH]—[NH$_2$] (μequiv/g) | 43 | 44 | 51 | 45 |
| Reaction rate of total amino groups: D | 0.9967 | 0.9968 | 0.9970 | 0.9969 |
| Relative viscosity | 2.65 | 2.64 | 2.66 | 2.64 |
| Number of gels or fish eyes (/m$^2$) | 500 | 200 | 300 | 3,000 |
| Yellowness index (YI) | −11 | −10 | −11 | −11 |

TABLE 3

| | Example 3 | Example 7 | Example 8 | Comparative Example 3 | Comparative Example 4 |
|---|---|---|---|---|---|
| Phosphorus acid antioxidant | Na hypophosphite | Na hypophosphite | Na hypophosphite | Na hypophosphite | Na hypophosphite |
| Alkaline component | Na acetate | Na acetate | Na acetate | Na acetate | Na acetate |
| Phosphorus concentration (ppm): A | 151 | 151 | 151 | 151 | 151 |
| Alkaline component/phosphorus acid antioxidant: C/B | 0.81 | 0.81 | 0.81 | 0.81 | 0.81 |
| [COOH]—[NH$_2$] (μequiv/g) | 45 | 8 | 82 | 2 | 120 |
| Reaction rate of total amino groups: D | 0.9975 | 0.9975 | 0.9975 | 0.9975 | 0.9975 |
| Relative viscosity | 2.65 | 4.06 | 2.17 | 4.50 | 1.70 |
| Number of gels or fish eyes (/m$^2$) | 200 | 400 | 300 | 5,000 | 500 |
| Yellowness index (YI) | −11 | −10 | −10 | −10 | −11 |

TABLE 4

| | Example 3 | Example 9 | Comparative Example 5 |
|---|---|---|---|
| Phosphorus acid antioxidant | Na hypophosphite | Na hypophosphite | Na hypophosphite |
| Alkaline component | Na acetate | Na acetate | Na acetate |
| Phosphorus concentration (ppm): A | 151 | 151 | 151 |
| Alkaline component/phosphorus acid antioxidant: C/B | 0.81 | 0.81 | 0.81 |
| [COOH]—[NH$_2$] (μequiv/g) | 45 | 43 | 51 |
| Reaction rate of total amino groups: D | 0.9975 | 0.9969 | 0.9980 |
| Relative viscosity | 2.65 | 2.64 | 2.69 |
| Number of gels or fish eyes (/m$^2$) | 200 | 300 | 3,000 |
| Yellowness index (YI) | −11 | −11 | −11 |

INDUSTRIAL APPLICABILITY

The polyamide resin composition according to the present invention includes the following advantages:

(1) It can produce good molded articles with less yellow discoloration and reduced gels or fish eyes;

(2) It can reduce clogging of a filter used during a molding process because of less yellow discoloration and reduced gels or fish eyes, and thus can avoid an increase in filter pressure. This leads to a reduction in frequency of replacement of the filter, thereby significantly improving productivity; and (3) It can reduce defects of a molded article and rejected products due to less yellow discoloration and reduced gels or fish eyes, thereby improving productivity.

Thus, it is suitable for the production of various resin articles, such as molded articles, films, sheets, and fibers.

The invention claimed is:

1. A polyamide resin composition comprising: a polyamide (x) having a diamine constituent unit comprising at least 70 mol % of m-xylylenediamine units and a dicarboxylic acid constituent unit comprising at least 70 mol % of adipic acid units; a phosphorus acid antioxidant; and an alkaline component; the polyamide resin composition satisfying the following formulae (1) to (4):

$$5 \leq A \quad (1)$$

$$0.5 \leq C/B \leq 1.5 \quad (2)$$

$$8 \leq ([COOH]-[NH_2]) \leq 82 \quad (3)$$

$$D \leq 0.9975 \quad (4)$$

where A represents the concentration (ppm) of phosphorus atoms derived from the phosphorus acid antioxidant relative to the total amount of the polyamide (x), the phosphorus acid antioxidant, and the alkaline component; B represents the number of moles of the phosphorus acid antioxidant contained in the composition; C represents the number of moles of the alkaline component contained in the composition, D represents the reaction rate of the total amino groups of the polyamide (x); [COOH] represents the terminal carboxyl group concentration (μequiv/g) in the polyamide (x); and [NH$_2$] represents the terminal amino group concentration (μequiv/g) in the polyamide (x).

2. The polyamide resin composition according to claim 1, wherein the total number of gels and fish eyes having a major axis of at least 50 μm observed in an unstretched film having a thickness of 50 μm prepared from the polyamide resin composition is 1000/m$^2$ or less.

3. The polyamide resin composition according to claim 1, wherein the polyamide (x) is prepared by melt polycondensation of a dicarboxylic acid component containing at least 70 mol % of adipic acid and a diamine component containing at least 70 mol % of m-xylylenediamine by adding the diamine component continuously or intermittently dropwise to the melt dicarboxylic acid component.

4. The polyamide resin composition according to claim 1, wherein the polyamide (x) is prepared by adding a diamine component containing at least 70 mol % of m-xylylenediamine continuously or intermittently dropwise to a melt dicarboxylic acid component containing at least 70 mol % of adipic acid to prepare a polyamide by melt polycondensation of the dicarboxylic acid and the diamine, and then drying the polyamide under reduced pressure.

5. The polyamide resin composition according to claim 1, wherein the polyamide (x) is prepared by adding a diamine component containing at least 70 mol % of m-xylylenediamine continuously or intermittently dropwise to a melt dicarboxylic acid component containing at least 70 mol % of adipic acid to prepare a polyamide by melt polycondensation of the dicarboxylic acid and the diamine, and then drying the polyamide in a solid state.

6. The polyamide resin composition according to claim 1, wherein the polyamide (x) is prepared by adding a diamine component containing at least 70 mol % of m-xylylenediamine continuously or intermittently dropwise to a melt dicarboxylic acid component containing at least 70 mol % of adipic acid to prepare a polyamide by melt polycondensation of the dicarboxylic acid and the diamine, and then polycondensating the polyamide in a solid state.

7. The polyamide resin composition according to claim 1, wherein the polyamide (x) is poly(m-xylylene adipamide).

* * * * *